United States Patent
Sung et al.

(10) Patent No.: US 10,792,968 B2
(45) Date of Patent: Oct. 6, 2020

(54) DOUBLE COMPRESSION RATIO TYPE BUSH AND SUSPENSION SYSTEM THEREBY

(71) Applicants: Hyundai Motor Company, Seoul (KR); Kia Motors Corporation, Seoul (KR); PYUNG HWA INDUSTRIAL CO., LTD., Daegu (KR)

(72) Inventors: Dae-Un Sung, Seoul (KR); Jun-Hyeong Park, Hwaseong-si (KR); Yong-Hyun Ryu, Seoul (KR); Soo-Hyun Lim, Daegu (KR)

(73) Assignees: Hyundai Motor Company, Seoul (KR); Kia Motors Corporation, Seoul (KR); PYUNG HWA INDUSTRIAL CO., LTD., Daegu (KR)

( * ) Notice: Subject to any disclaimer, the term of this patent is extended or adjusted under 35 U.S.C. 154(b) by 253 days.

(21) Appl. No.: 15/867,467

(22) Filed: Jan. 10, 2018

(65) Prior Publication Data
US 2018/0326804 A1    Nov. 15, 2018

(30) Foreign Application Priority Data
May 10, 2017    (KR) .................... 10-2017-0058213

(51) Int. Cl.
*B60G 7/02* (2006.01)
*B60G 3/06* (2006.01)
(Continued)

(52) U.S. Cl.
CPC ................ *B60G 7/02* (2013.01); *B60G 3/06* (2013.01); *F16F 1/387* (2013.01); *F16F 1/3807* (2013.01);
(Continued)

(58) Field of Classification Search
CPC ........ F16F 1/3807; F16F 1/387; F16F 1/3856; B60G 7/02; B60G 3/06; B60G 2204/1484; B60G 2204/4104
See application file for complete search history.

(56) References Cited

U.S. PATENT DOCUMENTS 3,392,971 A * 7/1968 Herbenar ............. B60G 7/02
                                                         267/269
5,887,859 A * 3/1999 Hadano ................ F16F 1/38
                                                         267/141.1
(Continued)

FOREIGN PATENT DOCUMENTS

| CN | 102865323 B | 10/2014 |
| EP | 0 684 404 B1 | 11/1998 |
| JP | 10-38002 A | 2/1998 |

*Primary Examiner* — Bradley T King
*Assistant Examiner* — James K Hsiao
(74) *Attorney, Agent, or Firm* — Morgan, Lewis & Bockius LLP

(57) ABSTRACT

A bushing may include an elastic compression portion configured to form a primary compression ratio due to a compressive deformation by a primary press-fitting load and be pressed by a secondary compression ratio greater than the primary compression ratio by a secondary press-fitting load greater than the primary press-fitting load, wherein the elastic compression portion is formed in an opened cross section to be a secondary surface contact larger than a primary surface contact without a bulge phenomenon by a volume dispersion in a state in which it is pressed by the primary press-fitting load to be the primary surface contact and then is pressed by the secondary press-fitting load.

13 Claims, 7 Drawing Sheets

(51) Int. Cl.
*F16F 1/38* (2006.01)
*F16F 1/387* (2006.01)

(52) U.S. Cl.
CPC ........ *F16F 1/3835* (2013.01); *B60G 2204/14* (2013.01); *B60G 2204/1484* (2013.01); *B60G 2204/4104* (2013.01); *F16F 1/3856* (2013.01)

(56) References Cited

U.S. PATENT DOCUMENTS

| | | | | |
|---|---|---|---|---|
| 5,938,220 | A * | 8/1999 | Torneld | B60G 3/06 267/141.7 |
| 6,224,046 | B1 * | 5/2001 | Miyamoto | B60G 3/202 267/140.12 |
| 6,910,670 | B2 | 6/2005 | Kato | |
| 8,505,889 | B2 * | 8/2013 | Suzuki | B60G 3/20 267/141.1 |
| 2002/0060385 | A1 * | 5/2002 | Mayerbock | B60G 7/02 267/293 |
| 2008/0174082 | A1 * | 7/2008 | Bunker | B60G 3/06 280/124.109 |
| 2008/0284076 | A1 * | 11/2008 | Miyahara | F16F 1/387 267/140.13 |
| 2015/0273967 | A1 * | 10/2015 | Grim | B60G 7/02 267/292 |
| 2017/0097061 | A1 * | 4/2017 | Rawlings | F16F 1/3828 |

* cited by examiner

DOUBLE COMPRESSION RATIO TYPE BUSH AND SUSPENSION SYSTEM THEREBY

CROSS-REFERENCE(S) TO RELATED APPLICATIONS

The present application claims priority to Korean Patent Application No. 10-2017-0058213, filed on May 10, 2017, the entire contents of which is incorporated herein for all purposes by this reference.

BACKGROUND OF THE INVENTION

Field of the Invention

The present invention relates to a bushing, and more, to a suspension system to which an optimally harmonized bushing is applied by forming bushing design elements, which are not matched with each other, at a double compression ratio.

Description of Related Art

Generally, a bushing includes elastic bodies, to which rubber is applied, for relative movement of connecting components.

Therefore, a vehicle to which a cross member (or subframe), a step bar (or stabilizer bar), a suspension arm (or lower arm or upper arm) or the like, which require relative movement, is applied requires a fastening portion using a bushing, and the application of the bushing improves riding and handling (R & H), noise, vibration, harshness (NVH), and durability of the vehicle.

The bushing applied to the fastening portion (or input point) of the suspension arm is configured as a suspension bushing that ensures stiffness in a radial direction and a circumferential direction (torsional direction) with respect to a movement of the suspension system, improving the R & H, the NVH, and the durability of the vehicle. Examples of the suspension bushing include a saddle bushing and a solid bushing that match the R & H with the NVH and the durability.

For example, the saddle bushing is configured for an external pipe, an internal pipe, and an intermediate pipe, and includes rubber vulcanized between the external pipe and the internal pipe in a state of wrapping the intermediate pipe. Therefore, the saddle bushing has a high single part weight and manufacturing processing cost due to the intermediate pipe requiring maintenance of vulcanization and surface cleanliness. However, the saddle bushing has improved durability due to excellent fatigue durability while having improved R & H performance due to an increase in lateral stiffness of the bushing in a radial direction (P direction) and a reduction in torsional friction in a circumferential direction (R direction) of the bushing.

For example, the solid bushing includes the external pipe and the internal pipe, and includes rubber vulcanized between the external pipe and the internal pipe. Therefore, the solid bushing has the reduced R & H performance due to an increase in torsional friction in the circumferential direction (R direction) of the bushing and a reduced durability due to a reduced fatigue durability when compared to the saddle bushing. However, the solid bushing has an advantage of reducing the size and reducing the weight, reduced manufacturing processing costs of the bushing when compared to the saddle bushing.

The information disclosed in this Background of the Invention section is only for enhancement of understanding of the general background of the invention and should not be taken as an acknowledgement or any form of suggestion that this information forms the prior art already known to one skilled in the art.

BRIEF SUMMARY

The suspension bushing is a component which has difficulty optimizing a structure thereof in that the R & H, the NVH, and the durability, which are design elements not correlated with each other, needs to be harmonized to meet the performance.

The following Table 1 shows the design elements applied to the suspension bushing.

TABLE 1

| | Requirements for performance (for example, lowering ↓, rising ↑) | | |
|---|---|---|---|
| Division | Stiffness in radial direction (P) | Stiffness in torsional direction (R) | Order of other preference factors |
| R & H | Stiffness ↑: Improve handling responsiveness | Friction ↓: Improve link behavior | Size ↓, hardness ↑, rubber amount ↓: Bushing which is solid and is small flowing |
| NVH | Stiffness ↓: Improve vibration insulation | Irrelevant | Hardness ↓, rubber amount ↑, size ↑: Soft bushing |
| Durability | Stiffness ↑: Minimize load deformation | Friction ↓: Improve stress dispersion | Rubber amount ↑, hardness ↑, size ↑: Bushing having large volume and small deformation |

The above Table 1 shows the difficulty in designing and developing the suspension bushing that satisfies mutual harmonics performance due to multiple conflicting situations of required performance, weight, and costs. Considering a process of performing a durability test after manufacturing to satisfy a selection of design elements and performance tuning, a selection of design elements that do not satisfy the durability performance leads to a delay or impossibility of mass production of products or may be one cause of field claims.

Furthermore, since the suspension bushing is a component to be common and incorporated irrespective of a vehicle model, the harmonization of design elements not matched with each other needs to be performed in consideration of various characteristics of each vehicle model, which makes the design and development difficulties more difficult.

Considering the above-mentioned aspects, the present invention can solve bulge characteristics for forming convex protrusions even in a change in a stepwise compression ratio of an elastic body according to a change in a magnitude of an applied bushing indentation load and can reduce a size of a bushing while ensuring durability performance with greatly improved fatigue durability because the elastic body is in a compressed state even in a large behavior of a suspension and ensuring R & H performance by adding a clamp shape to an opened cross section to reduce torsional stiffness.

Various aspects and exemplary embodiments of the present invention are directed to providing a suspension system to which a double compression ratio type bushing configured to be applied to a suspension arm of various specifications as a common component by changing one bushing from a low compression ratio to a high compression ratio is applied.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a bushing may include an elastic compression portion configured to form a primary compression ratio due to a compressive deformation by a primary press-fitting load and be pressed by a secondary compression ratio greater than the primary compression ratio by a secondary press-fitting load greater than the primary press-fitting load, wherein the elastic compression portion may include an elastic body formed such that on opened cross section to be a secondary surface contact is rubbed by a bushing behavior without a bulge phenomenon by a volume dispersion in a state in which it is pressed by the primary press-fitting load to be the primary surface contact and then is pressed by the secondary press-fitting load.

The elastic compression portion may be formed at both end portions of the elastic body, respectively and may form the opened cross section by configuring a difference (La–Lb) between a radial stiffness length La and a torsional stiffness length Lb of the elastic body to be 20 to 30%, and the secondary compression ratio may be configured to be 170 to 260% as compared to the primary compression ratio.

The opened cross section may include clamp-shaped cross-section portions continuously forming the primary compression ratio and the secondary compression ratio and a clamp notch cross-section portion extending from the clamp-shaped cross-section portions to solve the bulge phenomenon due to the secondary compression ratio and remove a stress concentration therein.

The clamp notch cross section portion may be formed as an opened region at a notch portion of the clamp-shaped cross-section portions, and may have any one of a 'U'-shaped cross section, a circular cross section, an oval cross section, and/or a polygonal cross section.

The upper clamp-shaped cross-section portion may be expanded at an upper opening angle above a notch virtual central line formed by the clamp notch cross-section portion to form a length of an upper rubber adhering portion and the lower clamp-shaped cross-section portion may be expanded at a lower opening angle less than the upper opening angle under the notch virtual central line K-K to form a length of a lower rubber adhering portion.

The length of the upper rubber adhering portion may include an upper opening surface forming the upper opening angle and an upper connecting surface extending from the upper opening surface at an angle different from the upper opening angle, and a length of the lower rubber adhering portion may include a lower opening surface formed at a length out of the upper connecting surface while forming the lower opening angle and a lower connecting surface extending from the lower opening surface at an angle different from the lower opening angle. An angle formed by the upper connecting surface and an upper surface of the elastic compression portion may be configured to be less than an angle formed by the opening surface and the upper surface and an angle formed by the lower connecting surface and a lower surface of the elastic compression portion may be configured to be less than an angle formed by the opening surface and the lower surface.

The elastic body may be provided between the internal pipe and the external pipe and may be vulcanized to integrate the internal pipe and the external pipe. The external pipe may wrap the internal pipe and left and right end portions of the internal pipe may protrude at both sides of the external pipe. Each of the left and right end portions may be wrapped with the elastic body to form the elastic compression portion.

In accordance with various exemplary embodiments of the present invention, a suspension system may include: a suspension arms configured to have bushing holes formed at left and right sides thereof and a bushing configured to be integrated with an internal pipe wrapped with an external pipe by vulcanization, including an elastic body formed at left and right sides thereof, the elastic body having left and right elastic compression portions that has a clamp-shaped cross section increasing a compression ratio in a response to an increase in a press-fitting load, and have the external pipe press-fitted in the bushing hole.

The internal pipe may be provided with a shaft hole bored therein and may have a total length protruding at both sides of the external pipe in a state in which it is wrapped with the external pipe. The elastic body may determine a torsional stiffness length to be 0.70 to 0.80 of a radial stiffness length when a clamp width interval of the left elastic compression portion and the right elastic compression portion is configured to be the radial stiffness length and clamp forming locations of the left elastic compression portion and the right elastic compression portion are configured to be the torsional stiffness length.

The suspension arm may have a structure in which a board is bent to extend to a knuckle of a wheel and a vehicle body and the bushing is provided with a connection portion between the suspension arm and the knuckle and a connection portion between the suspension arm and the vehicle body.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawings.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Figure 1:
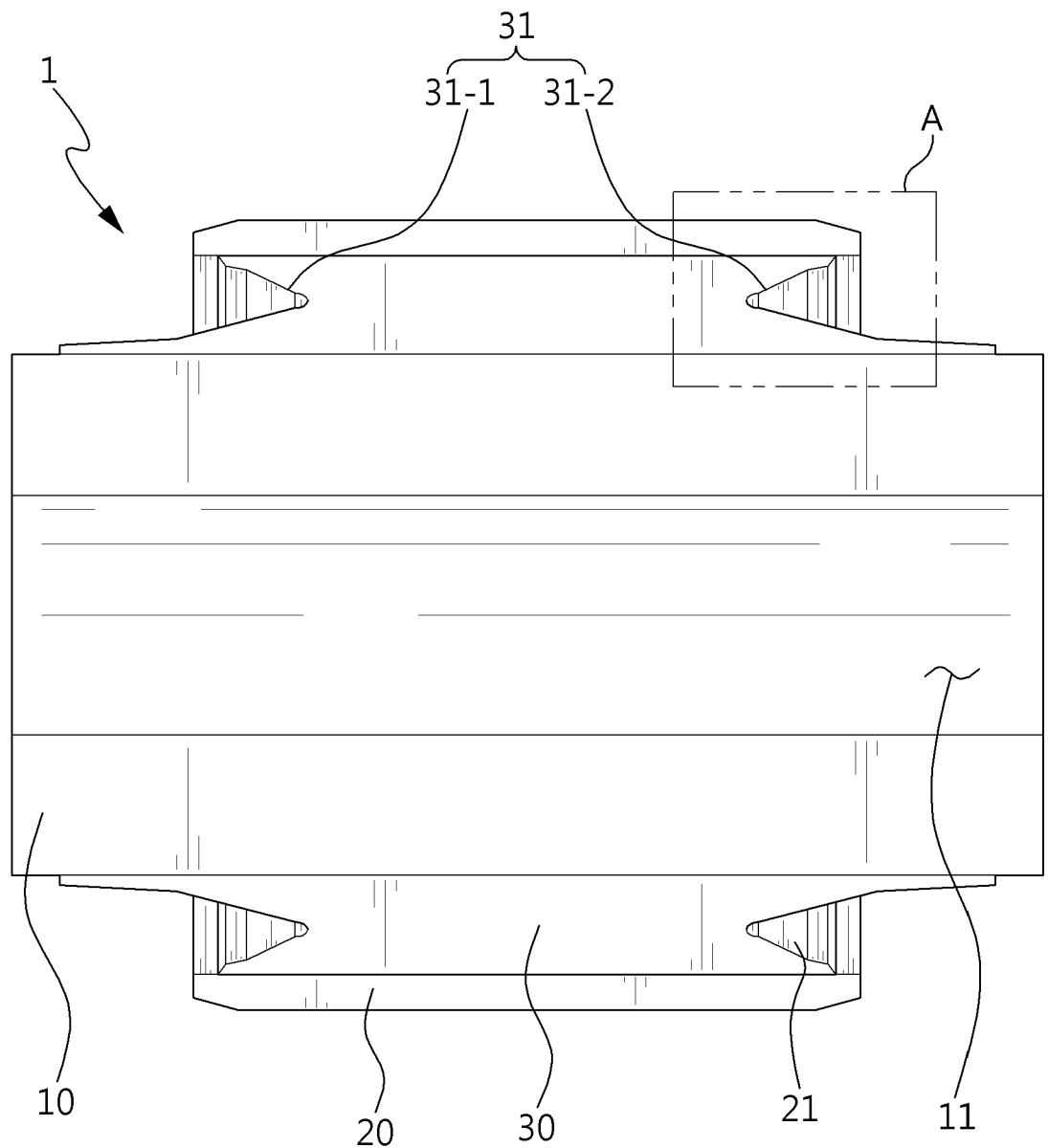
FIG. 1 is a schematic diagram of a double compression ratio type bushing according to an exemplary embodiment of the present invention.

Referring to FIG. 1, a bushing 1 includes an internal pipe 10 and an external pipe 20 which are integrally formed by vulcanization of an elastic body 30. The bushing 1 forms a double compression ratio due to a compressive deformation of the elastic body 30 ranging from 7% (low compression) to 12 to 18% (high compression) according to strength of an applied external force. Therefore, a secondary compression ratio in a high compression state of 12 to 18% is formed in a range of approximately 170 to 260% as compared to a primary compression ratio which is in a low compression state of 7%.

The internal pipe 10 is configured of a hollow pipe having a shaft hole 11, and the external pipe 20 is configured of a hollow pipe having a vulcanizing region 21 filled with the vulcanized elastic body 30 in a state in which the internal pipe 10 is inserted into the external pipe 20. A length of the internal pipe 10 is greater than a length of the external pipe 20, and the external pipe 20 is coupled at a location where right and left end portions of the internal pipe 10 protrude to left and right sides of the external pipe 20. Furthermore, each material of the internal pipe 10 and the external pipe 20 includes steel or a similar material, and a thickness thereof is determined and matched with design durability.

The elastic body 30 forms an elastic compression portion 31 so that compressive deformation of 7% to 18% occurs, and the elastic compression portion 31 is configured of left and right elastic compression portions 31-1 and 31-2 that are formed at left and right sides of the elastic body 30 using an opened cross section. The material of the elastic body 30 includes rubber, and each of the left and right elastic compression portions 31-1 and 31-2 has the same structure opened outwards by a clamp-shaped cross section (or V-shaped cross section). Furthermore, the elastic body 30 wraps the left and right end portions of the internal pipe 10 protruding to both sides of the external pipe 20 while being wrapped with the external pipe 20 so that each of the left and right elastic compression portions 31-1 and 31-2 extend to the locations of the left and right end portions.

Figure 2:
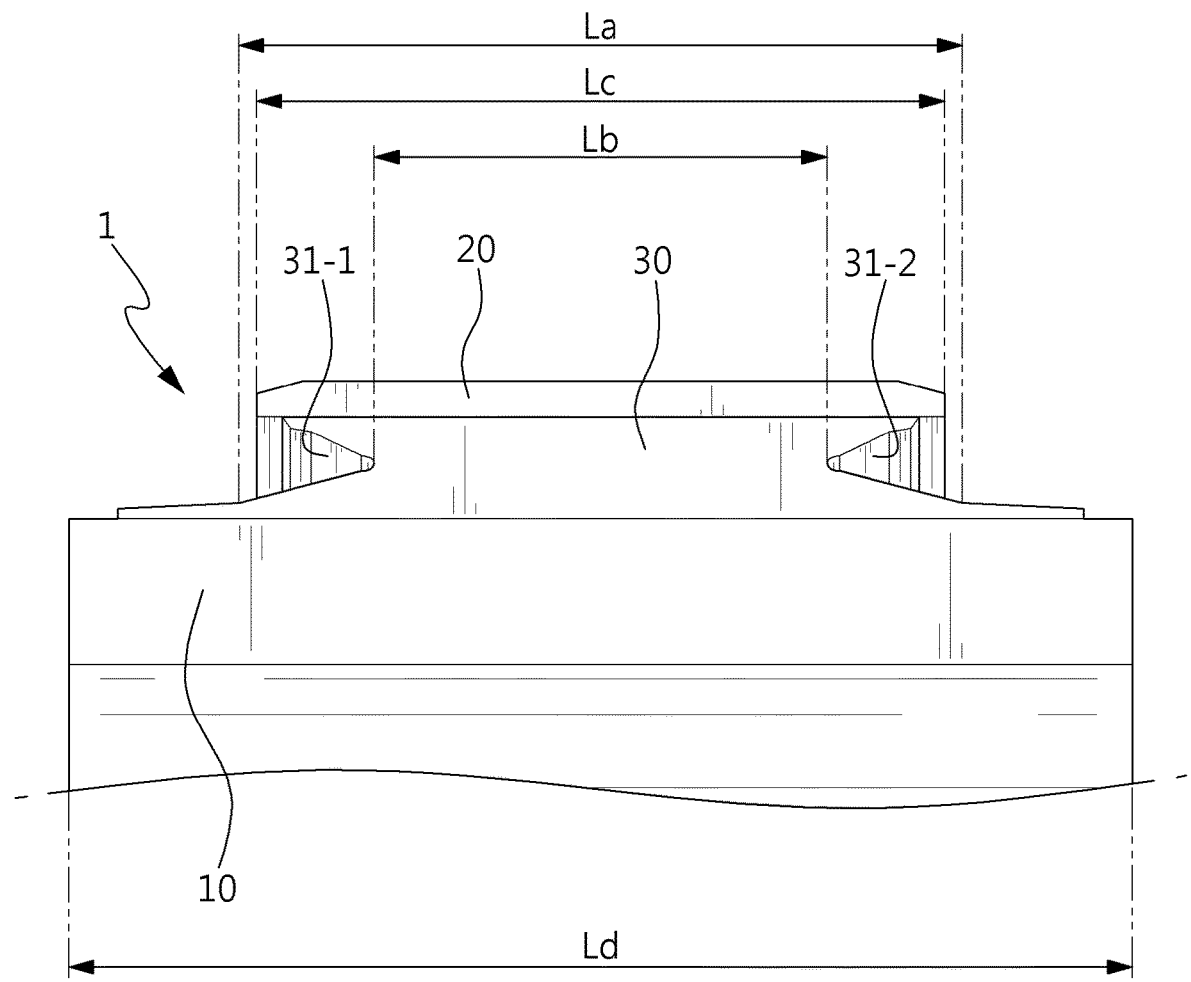
FIG. 2 is a diagram showing exemplary layout of an elastic body according to an exemplary embodiment of the present invention.
Figure 3:
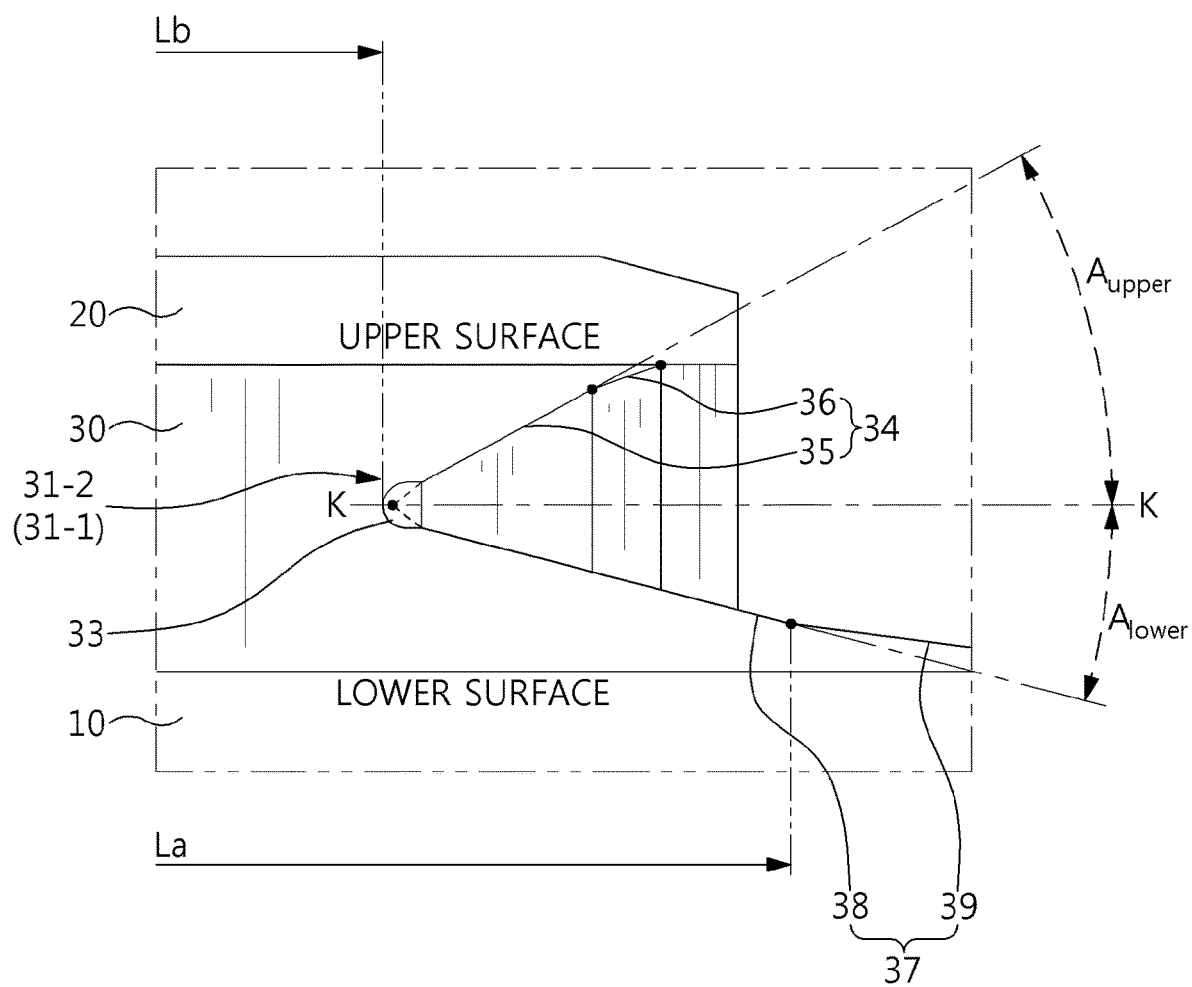
FIG. 3 is a detailed view of an elastic compression portion of the elastic body according to an exemplary embodiment of the present invention.

FIG. 2 and FIG. 3 show a layout of the elastic compression portion 31 and a detailed structure of the left and right elastic compression portions 31-1 and 31-2.

Referring to the layout of FIG. 2, the elastic compression portion 31 determines a radial stiffness length La of the left elastic compression portion 31-1 and the right elastic compression portion 31-2 to be disposed between a total length Ld of the internal pipe 10 and a total length Lc of the external pipe 20, while a torsional stiffness length Lb of the left elastic compression portion 31-1 and the right elastic compression portion 31-2 is set to be shorter than the total length Lc of the external pipe 20 to be internally disposed within the external pipe 20.

For example, the radial stiffness length La and the torsional stiffness length Lb are determined to have the following stiffness effective length relationship.

Difference in stiffness effective length:
$$La-Lb=20\sim30\%, Lb=(0.70\sim0.80)*La$$

In the above Equation, "*" refers to a product of two values.

Therefore, when the clamp width interval between the left and right elastic compression portions 31-1 and 31-2 is determined to be the radial stiffness length La, and the clamp forming locations of the left and right elastic compression portions 31-1 and 31-2 are determined to be the torsional stiffness length Lb, the elastic body 30 sets the difference La−Lb between the radial stiffness length La and the torsional stiffness length Lb to be 20 to 30% so that the clamp-shaped cross section (or V-shaped cross section) is formed in an opened cross section or the torsional stiffness length Lb is set to be 0.70 to 0.80 of the radial stiffness length La. As a result, the relationship between the radial stiffness length La and the torsional stiffness length Lb helps to improve the R & H and the durability performance by reducing the torsional friction in the torsional direction as compared to a solid bushing having the same size while ensuring the R & H and the durability performance by making a radial load support force after the primary and secondary compression process using the press fitting equal to or greater than that of the saddle bushing.

Referring to the detailed structure of FIG. 3, the right elastic compression portion 31-2 forms an upper clamp-shaped cross-section portion 34 above a clamp notch cross-section portion 33 and a lower clamp-shaped cross-section portion 37 thereunder with respect to the clamp notch cross-section portion 33 as a virtual central line K-K. As a result, the right elastic compression portion 31-2 forms the clamp-shaped cross section (or V-shaped cross section) which is open outwards with respect to the clamp notch cross-section portion 33 as a vertex.

For example, the clamped notch cross-section portion 33 is a 'U'-shaped cross section rounded to a radius of 0.5 mm. As a result, the clamp notch cross-section portion 33 is formed in a state in which a notch portion from which the clamp-shaped cross section (or V-shaped cross section) of the upper clamp-shaped cross-section portion 34 and the lower clamp-shaped cross-section portion 37 initiates is kept open outwards, improving a stress concentration of the notch portion due to the compression deformation.

Therefore, when the elastic compression portion 31 is compressed and deformed by 7% to 18%, the clamp notch cross-section portion 33 relieves the stress concentration in a response to the increase in the compression ratio while facilitating an adhesion between the upper clamp-shaped cross-section portion 34 and the lower clamp-shaped cross-section portion 37 without the bulge phenomenon and a volume dispersion function, improving the fatigue durability. A shape of the clamp notch cross-section portion 33 may be a circle, an oval, or a polygon that may relieve the stress but the size thereof is changed according to a size of the bushing 1, the compression ratio of the elastic body 30, and the load direction applied in the assembled state as variables.

For example, the upper clamp-shaped cross-section portion 34 is divided into an upper opening surface 35 and an upper connecting surface 36 and is inclined upward at an acute angle $A_{upper}$ with respect to the notch virtual central line K–K of the clamp notch cross-section portion. The upper opening surface 35 extends upwards from the clamp notch cross-section portion 33 at the opening angle $A_{upper}$ with respect to the notch virtual central line K–K while the upper connecting surface 36 is connected to the upper surface of the elastic compression portion 31 by being bent downwardly from the upper opening surface 35 at an angle less than the opening angle $A_{upper}$, forming at least two step angle. Furthermore, the lower clamp-shaped cross-section portion 37 is divided into a lower opening surface 38 and a lower connecting surface 39 and inclined downward at an opening angle $A_{lower}$ of an acute angle. The lower opening surface 38 extends downwardly from the clamp notch cross-section portion 33 at the opening angle $A_{lower}$ while the lower connecting surface 39 is connected to a lower surface of the elastic compression portion 31 by being bent upward having an angle less than the opening angle $A_{lower}$, forming at least two step angle.

Meanwhile, the upper surface of the elastic compression portion 31 refers to the portion vulcanized to the external pipe 20 and the lower surface of the elastic compression portion 31 refers to the portion vulcanized to the internal pipe 10. In the present case, an angle formed by the upper connecting surface 36 and the upper surface is configured to be less than the angle formed by the upper opening surface 35 and the upper surface, and at the same time the angle formed by the lower connecting surface 39 and the lower surface is configured to be less than the angle formed by the lower opening surface 38 and the lower surface. The opening angle $A_{upper}$ at which the upper opening surface 35 is formed with respect to the notch virtual central line K–K is configured to be greater than the opening angle $A_{lower}$ at which the lower opening surface 38 is formed with respect to the notch virtual central line K–K.

Therefore, the angle relationship imparted to the right elastic compression portion 31-2 is configured to increase the durability and obtain the volume dispersion induction to the upper clamp-shaped cross-section portion 34 and the lower clamp-shaped cross-section portion 37 when the elastic body 30 is compressed and deformed from a low compression of 7% to a high compression ratio of 12 to 18%.

The left elastic compression portion 31-1 formed at a location opposite to the right elastic compression portion 31-2 is also configured of the upper clamp-shaped cross-section portion 34 including the clamp notch cross-section portion 33, the upper opening surface 35, and the upper connecting surface 36 and the lower clamp-shaped cross-section portion 37 including the lower opening surface 38 and the lower connecting surface 39, wherein the structure and action thereof is the same as or substantially the same as those of the right elastic compression portion 31-2.

Therefore, the elastic body 30 forms the radial stiffness for a radial load support and the torsional stiffness for the reduction in the torsional friction in the state in which the upper and lower clamp-shaped cross-section portions 34 and 37 of the left and right elastic compression portions 31-1 and 31-2 are in contact with each other after the press-fitting process. Therefore, the bushing 1 can ensure the improved R & H and the durability performance due to the reduction in the torsional friction more than the solid bushing having the same size while ensuring the improved R & H and the durability performance due to the radial load support function more than the saddle bushing having the same size after the compression process by the double compression ratio function of the elastic body 30. Accordingly, the bushing 1 can achieve compactness in size having the reduced diameter and length while maintaining the same performance as the saddle bushing or the solid bushing. For example, experimentation confirms that the radial load support function and the torsional friction reduction function are equivalent to those of the saddle bushing or the solid bushing in the state in which the diameter of the bushing 1 is reduced to approximately 70 to 80% as compared to the saddle bushing or the solid bushing.

Figure 4:
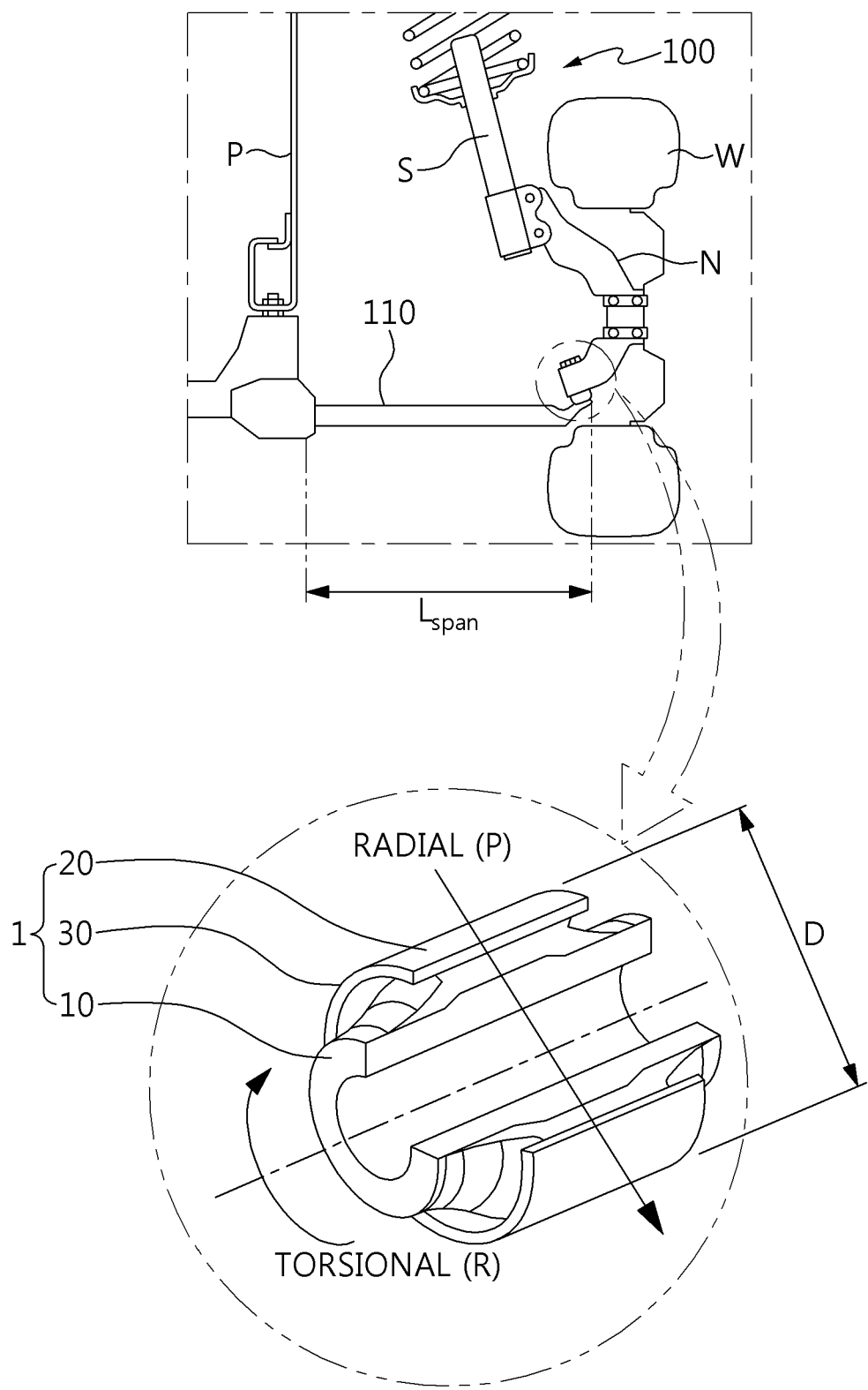
FIG. 4 is a diagram showing an example of a suspension system to which the double compression ratio type bushing according to an exemplary embodiment of the present invention is applied.

Referring to FIG. 4, the suspension system 100 includes a suspension arm 110 that forms a mounting portion of a shock absorber and extends from a knuckle N provided as a wheel W to a vehicle body P and the bushing 1 provided at a connection portion between the suspension arm 110 and the knuckle N and a connection portion between the suspension arm 110 and the vehicle body P.

The bushing 1 includes the internal pipe 10 and the external pipe 20 and the elastic body which is vulcanized therebetween and forms the double compression ratio from 7% (low compression) to 12 to 18% (high compression) due to the action of the elastic compression portion 31. Therefore, the bushing 1 is the same as or substantially the same as the bushing 1 described with reference to FIG. 1, FIG. 2, and FIG. 3.

The suspension arm 110 has a structure in which a board is bent in a rectangular cross section so that a bushing hole for press-fitting the bushing 1 is formed at both end portions thereof, and t diameter of the bushing hole is reduced to approximately 70 to 80% as compared to the saddle bushing hole or the solid bushing hole to match a reduced diameter D of the bushing 1. Therefore, the suspension arm 110 can reduce the width to approximately 70 to 80% while shortening a total length $L_{span}$ by the bushing hole having the reduced diameter of both end portions thereof.

Figure 5A:
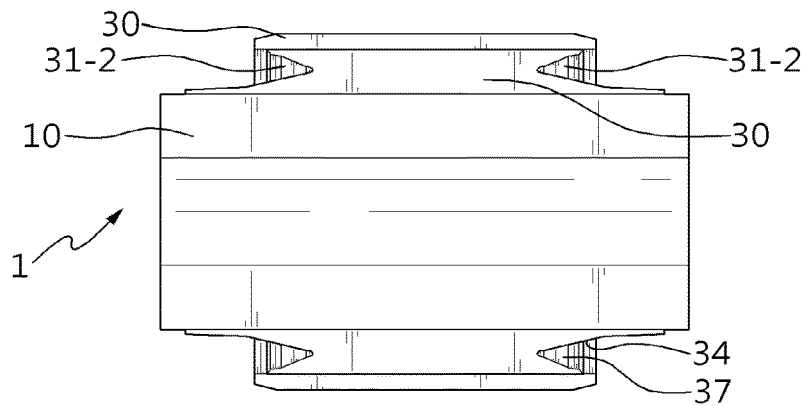
FIG. 5A, FIG. 5B, and FIG. 5C are diagrams showing a state in which a secondary compression ratio is formed after a primary compression ratio is formed in accordance with a load applied to the bushing according to an exemplary embodiment of the present invention.
Figure 5B:
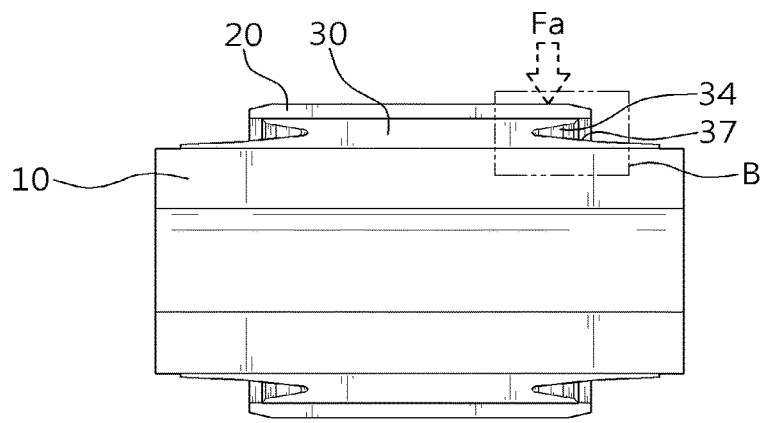
Figure 5C:
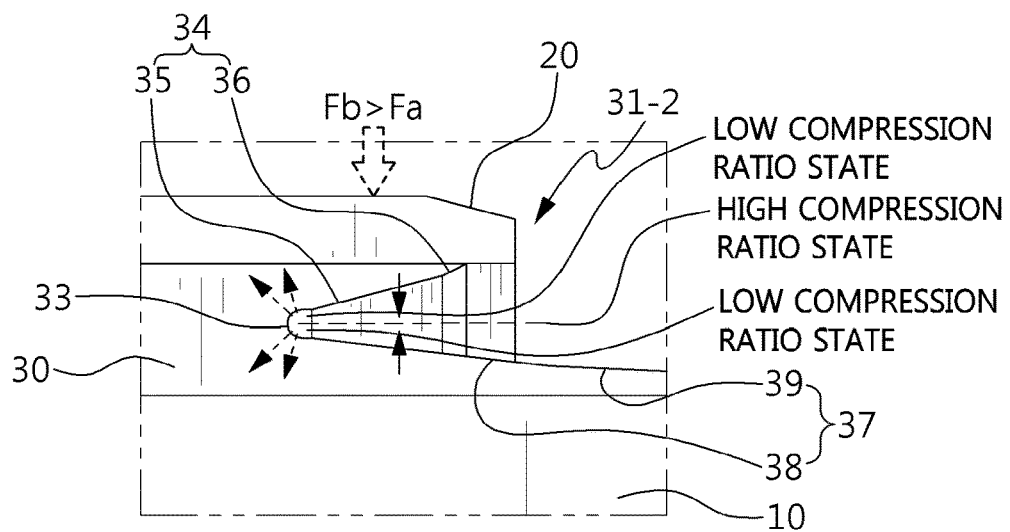

FIG. 5A, FIGS. 5B, and 5C show a state in which the primary and secondary compression ratios of the bushing 1 press-fitted in the bushing hole of the suspension arm 110 are formed.

As shown in FIG. 5A, before the bushing 1 is press-fitted, the elastic compression portion 31 of the elastic body 30 is not changed before the press-fitting, wherein the opened clamp-shaped cross section (or V-shaped cross section) of the left and right elastic compression portions 31-1 and 31-2 is maintained as is. However, as shown in FIG. 5B, after the bushing 1 is primarily press-fitted, the elastic compression portion 31 of the elastic body 30 is compressed and deformed by a primary press-fitting load Fa applied to the external pipe 20 press-fitted in the bushing hole, wherein the upper and lower clamp-shaped cross-section portions 34 and 37 are changed to a surface-contact state while adhering to each other. Next, as shown in FIG. 5C, after the bushing 1 is secondarily press-fitted, the elastic compression portion 31 of the elastic body 30 is more compressed and deformed by a secondary press-fitting load Fb applied to the external pipe 20 press-fitted in the bushing hole which is larger than the primary press-fitting load Fa, wherein the adhering portion of the upper and lower clamp-shaped cross-section portions 34 and 37 is increased and a surface-contact area is increased further.

For example, as an example of the right elastic compression portion 31-2 of FIG. 5C, the primary press-fitting load Fa that presses the right elastic compression portion 31-2 brings the upper opening surface 35 and the upper connection surface 36 and the lower opening surface 38 and the lower connecting surface 39 into close contact with the notch virtual central line K-K of the clamp notch cross-section portion 33, forming the primary compression ratio. As a result, the upper opening surface 35 comes into close contact with the notch virtual central line K-K in the primary compression ratio state to form a surface contact with the lower opening surface 38. Next, the secondary press-fitting load Fb that presses the right elastic compression portion 31-2 with a force greater than the primary press-fitting load Fa brings the upper opening surface 35 and the upper connecting surface 36 and the lower opening surface 38 and the lower connection surface 39 into close contact with the notch virtual central line K-K of the clamp notch cross-section portion 33, forming the secondary compression ratio. As a result, the upper opening surface 35 and the upper connecting surface 36 come into close contact with the notch virtual central line K-K in the secondary compression ratio state to form a surface contact with the lower opening surface 38. Furthermore, the clamp notch cross-section portion 33 is deformed due to the pressing of the right elastic compression portion 31-2 by the primary press-fitting load Fa and the secondary press-fitting load Fb to obtain the volume dispersion effect, achieving the primary and secondary compression ratios without the bulge phenomenon.

In terms of the increase in durability against rubber expansion during the bushing compression process and the volume dispersion induction after the bushing compression process, the effects obtained from the angle relationship formed by the upper/lower opening surfaces 35 and 38 and the upper/lower connecting surfaces 36 and 39 of the left and right elastic compression portions 31-1 and 31-2 are as follows.

For example, in terms of the increase in durability, the angle formed by the upper connecting surface 36 and the upper surface is set to be less than the angle formed by the upper opening surface 35 and the upper surface, and at the same time the angle formed by the lower connecting surface 39 and the lower surface is set to be less than the angle formed by the lower opening surface 38 and the lower surface. As a result, the left and right elastic compression portions 31-1 and 31-2 enable the durability of the elastic body 30 to be increased even in the rubber expansion state of a line portion of an end portion of a rubber bonding portion vulcanized to the external pipe 20. In terms of the volume dispersion induction, the opening angle $A_{upper}$ at which the upper opening surface 35 is formed with respect to the notch virtual central line K-K is set to be greater than the opening angle $A_{lower}$ at which the lower opening surface 38 is formed with respect to the notch virtual central line K-K. As a result, after the bushing compression process, the left and right elastic compression portions 31-1 and 31-2 enables the volume dispersion induction of the elastic body 30 through the adhering portion of the rubber of the right elastic compression portion 31-2 vulcanized to the internal pipe 10 having a length longer than that of the adhering portion of the rubber of the right elastic compression portion 31-2 vulcanized to the external pipe 20.

Therefore, the left and right elastic compression portions 31-1 and 31-2 may impart the radial load support function with the radial stiffness and the torsional friction reduction function with the torsional stiffness in the surface-contact state of the upper clamp-shaped cross-section portion 34 and the lower clamp-shaped cross-section portion 37. When the elastic body 30 is compressed and deformed from the low compression ratio of 7% to the high compression ratio of 12 to 18%, the increase in durability and the volume dispersion induction effect to the upper clamp-shaped cross-section portion 34 and the lower clamp-shaped cross-section portion 37 can be obtained. As a result, the bushing 1 can ensure the improved R & H and the durability performance due to the reduction in the torsional friction more than the solid bushing having the same size while ensuring the improved R & H and the durability performance due to the radial load support function more than the saddle bushing having the same size after the compression process by the double compression ratio function of the elastic body 30.

Accordingly, the bushing 1 can achieve compactness in size having the reduced diameter and length while keeping the same performance as the saddle bushing or the solid bushing. For example, experimentation confirmed that the radial load support function and the torsional friction reduction function are equivalent to those of the saddle bushing or the solid bushing in the state in which the diameter of the bushing 1 is reduced to approximately 70 to 80% as compared to the saddle bushing or the solid bushing.

Figure 6:
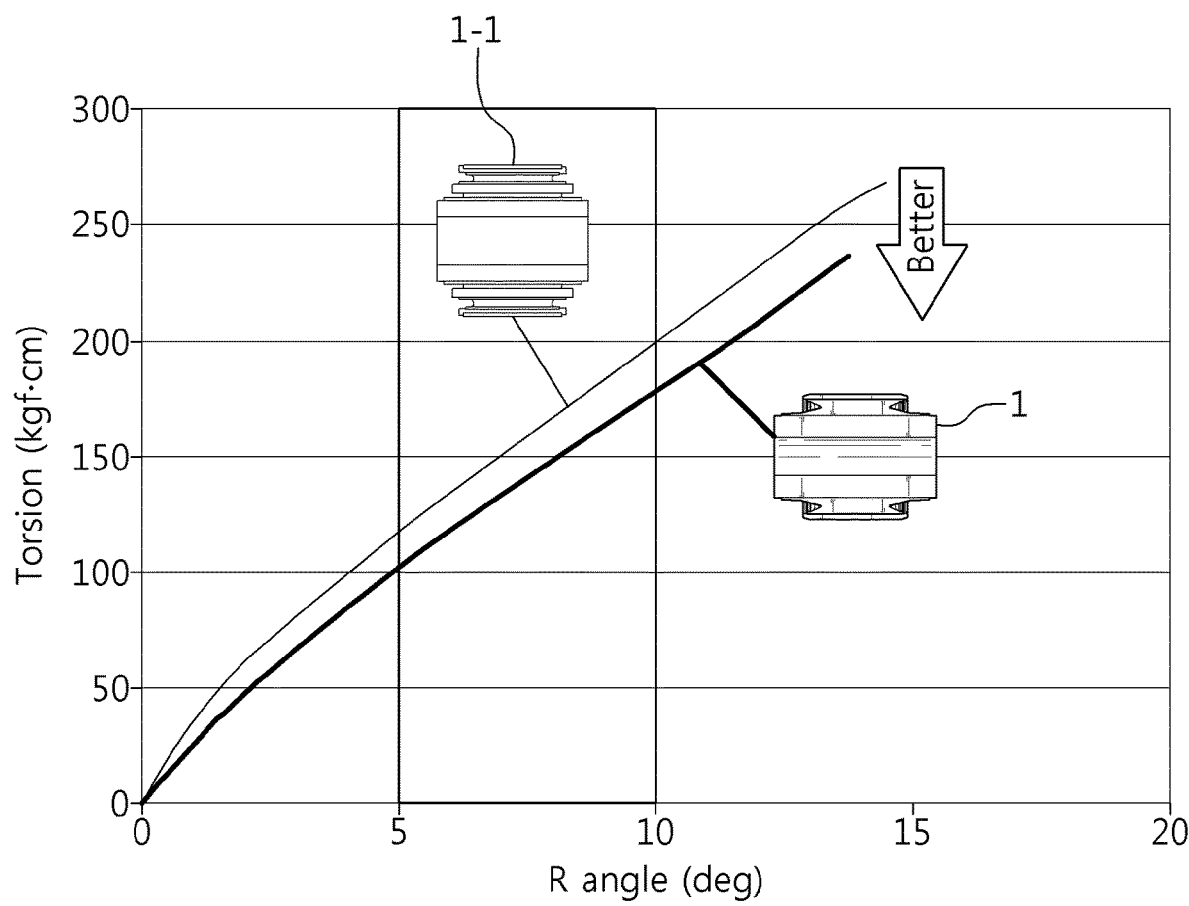
FIG. 6 is a diagram showing an example of a torsional friction reduction diagram of the bushing of the suspension system according to an exemplary embodiment of the present invention.
Figure 7:
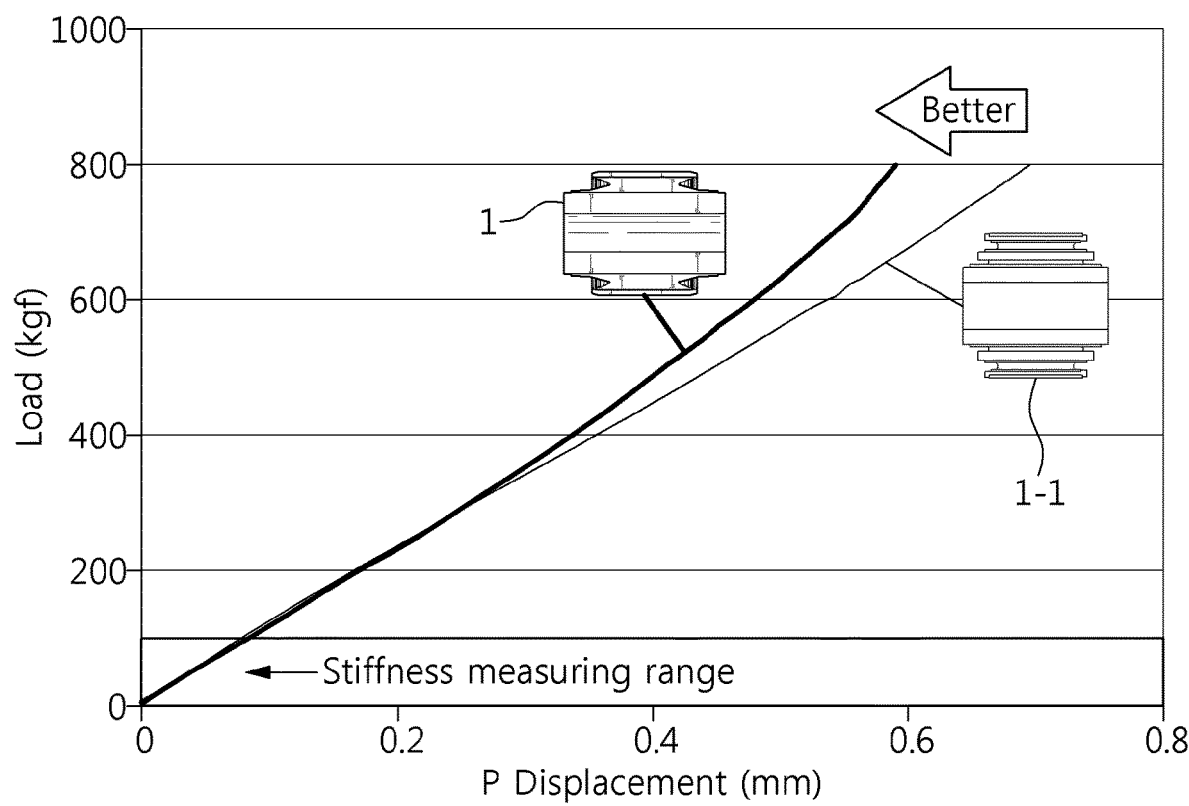
FIG. 7 is a diagram showing an example of a compliance reduction diagram (that is, a state in which a deformation of the bushing is reduced in a large behavior of the suspension) of the bushing of the suspension system according to an exemplary embodiment of the present invention.

FIG. 6 shows a torsional friction reduction diagram of the bushing 1 compared with a saddle bushing 1-1, and FIG. 7 is an example of a compliance reduction diagram which is a ratio of warpage to torsional stress. Experimentation proved that like the torsional friction reduction diagram of FIG. 6, the bushing 1 has the torsional friction reduced by approximately 13 to 23% less than that of the saddle bushing 1-1, and at the same time, like the compliance reduction diagram of FIG. 7, the compliance is reduced by approximately 10 to 20%.

As described above, the bushing 1 according to the present exemplary embodiment solves the bulge phenomenon by dispersing the stress concentration by the volume dispersion during the press-fitting process while forming the primary and secondary compression ratios having different sizes matching the primary and secondary press-fitting loads by the left and right elastic compression portions 31-1 and 31-2 of the clamp-shaped cross section (V-shaped cross section). Accordingly, the bushing 1 can be made into a common component using characteristics changed from the low compression ratio to the high compression ratio. The suspension system 100 may be configured as the suspension arm 110 using the low compression bushing 1 to which the primary compression ratio is applied and the high compression bushing 1 to which the secondary compression ratio is applied and therefore can be variously configured.

The bushing applied to the suspension system of the present invention has the double compression ratio to realize the following actions and effects.

First, it is possible to facilitate the bushing design by harmonizing the bushing design elements not matched with each other by the change in the double compression ratio of the elastic body. Second, the performance harmonization of the R & H, the NVH and the durability by the double compression ratio may be achieved. Third, since the components share common use with the double compression ratio, it can be applied irrespective of the vehicle model when being applied to a real car. Fourth, the fatigue durability for ensuring driving and durability is greatly improved at the double compression ratio from 7% (low compression) to 12 to 18% (high compression) during the press-fitting process for the suspension arm. Fifth, it is possible to eliminate the bulge phenomenon when changing from the low compression ratio to the high compression ratio by applying the cramp or the V-cut closure structure, and to greatly prolong the durability life by eliminating the bulge phenomenon. Sixth, it is possible to improve the R & H performance by setting the width interval and the forming position of the cramp of the elastic compression portion to reduce the bushing torsional friction. Seventh, the weight reduction can be achieved at the high compression ratio ranging from 12 to 18%, and the reduction in the size of the suspension arm can include the reduction in the size as compared to the saddle bushing. Eighth, the weight and cost of the bushing and the suspension arm can be achieved by reducing the size.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bushing comprising:
   an elastic compression portion configured to form a primary compression ratio due to a compressive deformation by a primary press-fitting load and be pressed by a secondary compression ratio greater than the primary compression ratio by a secondary press-fitting load greater than the primary press-fitting load,
   wherein the elastic compression portion is formed at a first end portion and a second end portion of an elastic body, respectively, and a size of an opened cross section formed by the elastic compression portion is 20% to 30% of difference between a radial stiffness length and a torsional stiffness length of the elastic body.

2. The bushing of claim 1, wherein the secondary compression ratio is set to be 170% to 260% as compared to the primary compression ratio.

3. The bushing of claim 1, wherein the opened cross section is configured of a cross section portion continuously forming the primary compression ratio and the secondary compression ratio and a notch cross section portion extending from the cross section portion to remove a stress concentration.

4. The bushing of claim 3, wherein the notch cross section portion is formed as an opened region at a notch portion of the cross section portion.

5. The bushing of claim 3, wherein the notch cross section portion has one of a circular cross section, an oval cross section, and a polygonal cross section.

6. The bushing of claim 3, wherein an upper cross section portion of the cross section portion is expanded at an upper opening angle to form a length of an upper rubber adhering portion and a lower cross section portion of the cross section portion is expanded at a lower opening angle to form a length of a lower rubber adhering portion.

7. The bushing of claim 6, wherein the upper opening angle is greater than the lower opening angle.

8. The bushing of claim 6, wherein the length of the upper rubber adhering portion includes an upper opening surface forming the upper opening angle and an upper connecting surface extending from the upper opening surface at an angle different from the upper opening angle, and the length of the lower rubber adhering portion includes a lower opening surface forming the lower opening angle and a lower connecting surface extending from the lower opening surface at an angle different from the lower opening angle.

9. The bushing of claim 8, wherein the lower opening surface is formed at a length out of the upper connecting surface.

10. The bushing of claim 8, wherein an angle formed by the upper connecting surface and an upper surface of the elastic compression portion is set to be less than an angle formed by the upper opening surface and the upper surface.

11. The bushing of claim 8, wherein an angle formed by the lower connecting surface and a lower surface of the elastic compression portion is set to be less than an angle formed by the lower opening surface and the lower surface.

12. A suspension system comprising:
    suspension arms having bushing holes formed at predetermined sides thereof; and
    a bushing configured to be integrated with an internal pipe wrapped with an external pipe by vulcanization, including an elastic body formed at predetermined sides thereof, the elastic body having first and second elastic compression portions that have a cross section increasing a compression ratio in a response to an increase in a press-fitting load, and have the external pipe press-fitted in the bushing holes,
    wherein the elastic body sets a torsional stiffness length of the first and second elastic compression portions to be 0.70 ratio to 0.80 ratio of a radial stiffness length of the first and second elastic compression portions.

13. A bushing comprising:
    an elastic compression portion configured to form a primary compression ratio due to a compressive deformation by a primary press-fitting load and be pressed by a secondary compression ratio greater than the primary compression ratio by a secondary press-fitting load greater than the primary press-fitting load,
    wherein the secondary compression ratio is set to be 170% to 260% as compared to the primary compression ratio.

* * * * *